Aug. 22, 1961     A. J. DELEHANTY     2,996,914
TENSION GAUGE
Filed April 7, 1958     2 Sheets-Sheet 1
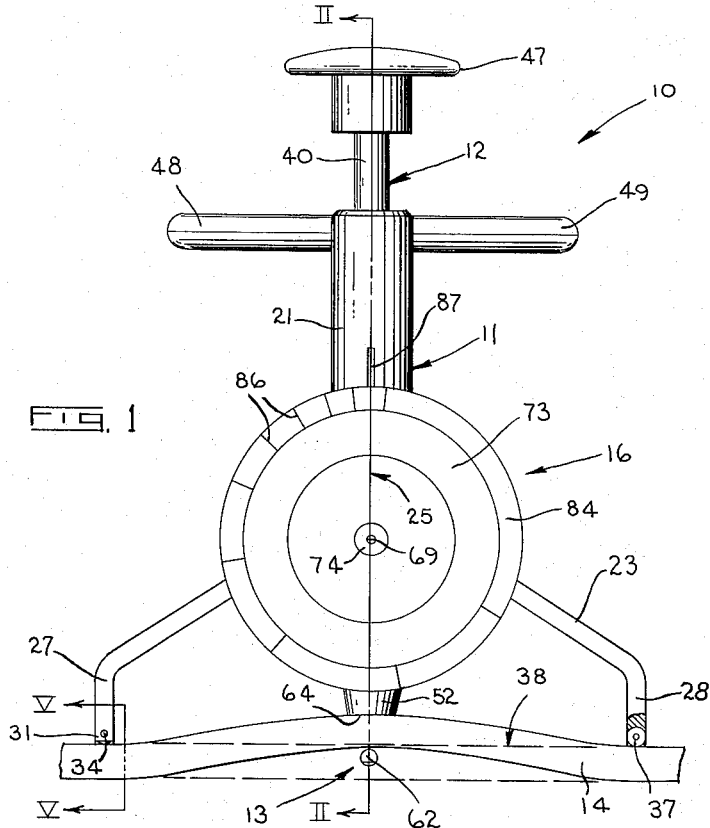
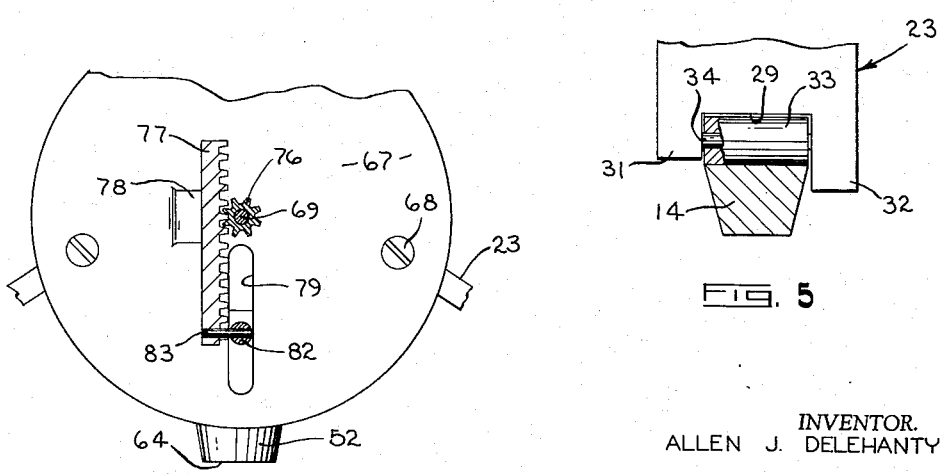
INVENTOR.
ALLEN J. DELEHANTY
BY
Woodhams Blanchard & Flynn
ATTORNEYS Aug. 22, 1961  A. J. DELEHANTY  2,996,914
TENSION GAUGE Filed April 7, 1958  2 Sheets-Sheet 2

INVENTOR.
ALLEN J. DELEHANTY
BY
*Woodhams Blanchard & Flynn*
ATTORNEYS

United States Patent Office 2,996,914
Patented Aug. 22, 1961

2,996,914
TENSION GAUGE
Allen J. Delehanty, Kalamazoo Township, Kalamazoo County, Mich., assignor to Burroughs Tool & Equipment Corporation, Kalamazoo, Mich., a corporation of Michigan
Filed Apr. 7, 1958, Ser. No. 726,967
5 Claims. (Cl. 73—144)

This invention relates in general to a tension gauge and, more particularly, to a type thereof which will accurately and visually indicate the tension on an elongated element even though such element is irregular in size or shape.

The need for and use of a gauge for testing the tension on an elongated flexible element, such as the reach of a belt, are well known, particularly in the automotive industry. Many such devices have been developed and are in use. However, insofar as I am aware, these devices are either complicated in structure and expensive to produce or are inaccurate in their determinations. The inaccuracy arises largely from the fact that at least the inexpensive forms of tension gauges do not allow for variations in thickness of the element being tested, which variations result from wear or irregularities created during the use or construction of the element. For example, existing gauges designed to test fan belts are usually arranged for engaging the belt at three spaced points, the intermediate point being on the opposite side of said belt from the outer points. The gauge is calibrated, when manufactured, for a belt of a selected thickness. Thus, if the belt is irregular in size, is worn or is otherwise different from the calibrated standard, the indications of the gauge will be inaccurate.

Although the tension gauge disclosed herein can be used to test the tension on any elongated flexible element, its structure has been designed primarily for use with pulley belts. More specifically, said gauge has been adapted for use on automotive fan belts, where the need of accurate tensioning has been especially apparent for many years.

Accordingly, a primary object of this invention has been the provision of a tension gauge for detecting and indicating the tension on an elongated flexible element, such as the fan belt of an automotive vehicle.

A further object of this invention has been the provision of a tension gauge, as aforesaid, which is arranged to compensate automatically for variations in the thickness of the element being tested and which positively engages the element during the testing operation.

A further object of this invention has been the provision of a tension gauge, as aforesaid, which can be easily and manually operated by any garage mechanic, which indicates the tension directly in pounds of force and which can be easily operated by one hand.

A further object of this invention has been the provision of a tension gauge, as aforesaid, which is small in size, pleasing in appearance, fool-proof in operation, requires little or no maintenance and which is sufficiently sturdy in structure that rugged treatment will not reduce its accuracy of operation.

Other objects and purposes of this invention will become apparent to persons familiar with this type of equipment upon reading the following specification and examining the accompanying drawings in which:

FIGURE 1 is a side elevational view of a tension gauge embodying the invention.

FIGURE 3 is a sectional view taken along the line III—III of FIGURE 2.

FIGURE 5 is a sectional view taken along the line V—V of FIGURE 1.

Figure 2:
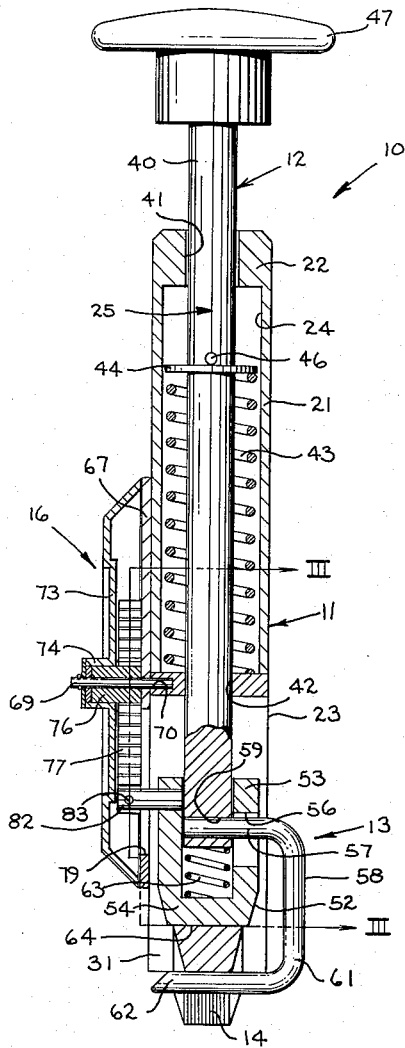
FIGURE 2 is a sectional view taken along the line II—II of FIGURE 1.

For convenience in description, the terms "upper," "lower" and derivatives thereof will have reference to the gauge as appearing in FIGURES 1 and 2. The terms "inner," "outer" and derivatives thereof will have reference to the geometric center of said tension gauge and parts thereof.

GENERAL DESCRIPTION

The objects and purposes of the invention, including those set forth above, have been met by providing a gauge for testing the tension of a fan belt, said gauge having a base frame from which a pair of spaced belt engaging members extend. A manually operable plunger is reciprocably supported upon the base frame for movement lengthwise thereof along a first line perpendicular to a second line connecting the outer ends of the belt engaging members. The plunger is movable into a position where one end thereof is adjacent to the said second line connecting the ends of the belt engaging members. Resiliently compressible means on the base frame urges the plunger away from this position. An indicating dial, which is also supported upon the frame, visually indicates the spacing between the said second line and the adjacent end of the plunger. Gripping means is provided to hold the belt snugly adjacent to the belt engaging end of the plunger.

Detailed construction

The tension gauge 10 (FIGURES 1 and 2), herein selected to illustrate the invention, is comprised of a frame 11, a manually operable plunger 12 reciprocably supported upon said frame 11, gripping mechanism 13 for holding an elongated element, such as the belt 14, with respect to the lower end of the plunger 12, and a tension indicator 16. The frame 11 is comprised of a hollow cylindrical member 21 having an end wall 22 at its upper axial end and being open at its lower axial end. A substantially U-shaped bar 23 is secured intermediate its ends to the lower end of the cylindrical member 21 by any convenient method, such as welding, so that it encloses the lower end of the chamber 24 within the cylindrical member 21. The U-bar 23 has end portions 27 and 28 which are preferably, but not necessarily, substantially parallel with, and spaced equidistant from, the lengthwise axis 25 of the cylindrical member 21. The outer free end of the end portion 27 (FIGURE 5), for example, has a notch 29 (FIGURE 5) flanked by the downward projections 31 and 32. A roller 33 is rotatably supported upon and between the projections 31 and 32 by means of the shaft 34. The projection 32 extends substantially below the lower peripheral surface of the roller 33 for reasons appearing hereinafter.

The end portion 28 may be, and preferably is, substantially identical with the end portion 27 and similarly supports a roller 37. The rollers 33 and 37 (FIGURE 1) are preferably disposed so that their lower peripheral surfaces define a plane 38 perpendicular to the central axis 25 of the cylindrical member 21.

The plunger 12 includes a rod 40 which slidably extends through the openings 41 and 42 in the end wall 22 and central part of the U-bar 23, respectively, so that it is substantially coaxial with said cylindrical member 21. A spiral spring 43 is sleeved upon the rod 40 within the chamber 24 and is held under compression between the U-bar 23 and a ring 44 which encircles the rod 40 and is held against upward movement along said rod by the pin 46. The rod 40 is of sufficient length that a substantial portion thereof extends below the U-bar 23 when the pin 46 is adjacent to the end wall 22. A flanged knob 47 is mounted, as by threaded engagement, upon the upper end of the rod 40. A pair of coaxial posts 48 and 49 are secured to, and extend radially from, diametrically opposite sides of the cylindrical member 21 adjacent to the upper ends thereof.

A substantially cylindrical end cap 52 having a side wall 53 and end wall 54 is sleeved upon the lower end of the rod 40 for snug slidable engagement therewith. Said side wall 53 has a lengthwise slot 56 through which one arm 57 of a U-shaped gripping member 58 is slidably received. Said arm 57 is received into diametrically disposed opening 59 in the lower end of the rod 40 and rigidly held therein in any convenient manner as by staking. The gripping member 58 has bight 61 spaced radially outwardly from the cap 52 and an integral lower arm 62 parallel with, and spaced from, the upper arm 57. The cap 52 is limited in its axial movement with respect to the rod 40 by the length of the slot 56 through which the upper arm 57 extends. Resilient means, such as the spiral spring 63, is held under compression within the cap 52 between its lower end wall 54 and the adjacent lower end of the rod 40. Thus, the cap 52 is normally in its extended position with respect to the rod 40 wherein the arm 57 is engaged by the upper end of the slot 56. In such case, the lower surface 64 of the end wall 54 is preferably spaced from the lower arm 62 a distance slightly less than the thickness of the element, such as the belt 14, whose tension will be normally tested by the gauge 10.

The tension indicator 16 includes a mounting plate 67 which is secured to one side of the frame 11 by means of the screws 68, which are threadedly engaged with said U-bar 23. The center of said plate, which is preferably circular in this embodiment, is aligned approximately with the center of the U-bar 23. A pivot pin 69 is seated in an opening 70 in the U-bar 23 and extends perpendicularly through the center of the mounting plate 67. A circular dial plate 73 has a central hub 74 on its outer side through which the pivot pin 69 coaxially extends. A gear 76 is rotatably sleeved upon the pivot pin 69 and is secured to the inner side of the dial plate 73, the gear 76 being adjacent to the mounting plate 67. A substantially vertical rack 77 is held in toothed engagement with the gear 76 by means of the integral rack guide 78 on the mounting plate 67 spaced sidewardly from the pivot pin 69.

The mounting plate 67 has a radially disposed substantially vertical slot 79 extending from a point adjacent to the gear 76 to a point near the periphery of the mounting plate 67. A rack post 82 slidably extends through the slot 79 and is secured to the cap 52 near the upper end thereof preferably so that it is substantially parallel with the arm 57 on the gripping member 58. The outer end of the rack post 82 is secured to the lower end of the rack 77 by means of a pin 83. Accordingly, upward and downward movement of the cap 52 operates through the post 82 to effect a corresponding movement of the rack 77. Inasmuch as the rack 77 is engaged with the gear 76, which is connected to the dial plate 73, vertical movement of the rack 77 effects a rotation of the dial plate 73.

Figure 4:
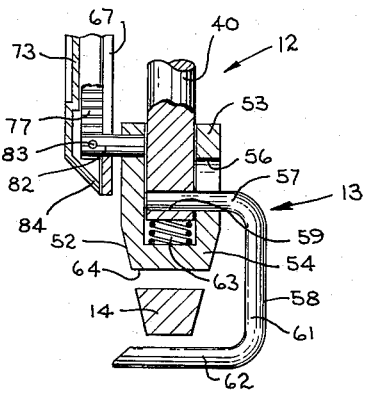
FIGURE 4 is a fragment of FIGURE 2 showing the structure thereof in a different position of operation.

The peripheral edge 84 of the dial plate 73 is sloped toward the mounting plate 67 in order to substantially enclose the rack 77 and gear 76 disposed between the dial plate 73 and the mounting plate 67. The length of the slot 79 in the mounting plate 67 is such that the rack post 82 will engage the upper end of said slot approximately when the spring pin 46 in the rod 40 is adjacent to the upper end of the chamber 24 in the cylindrical member 21. The slot 79 is arranged so that the rack post 82 engages the lower end of the slot 79 when the knob 47 is spaced above the cylindrical member 21 a distance slightly greater than the stroke of the arm 57 within the slot 56. Thus, when the rack post 82 bottoms in the slot 79, the rod 40 can still be moved downwardly, thereby pressing the spring 63 until the arm 57 bottoms in the slot 56, as shown in FIGURE 4. The peripheral edge 84 of the dial plate 73 is provided with calibrated markings 86 which are alignable with an indicator 87 on the surface of the cylindrical member 21 for giving a direct reading of the amount of tension on the belt 14 engaged by the tension gauge 10.

*Operation*

In general, the tension gauge is operated by manually grasping it so that the flanged knob 47 is cupped in the palm of the hand and the posts 48 and 49 are engaged by two fingers each of one hand. Thus, the plunger 12 is moved through the cylindrical member 21 against the contrary urging of the spring 43 by manually squeezing the knob 47 toward the posts 48 and 49. When it becomes desirable to use the tension gauge 10 for the purpose of testing the tension of the belt 14, the knob 47 is moved toward the cylindrical member 21 until the rack post 82 is first bottomed in the slot 79 and the arm 57 is then bottomed in the slot 56, whereby both the spring 43 and spring 63 are under their maximum compression. Under these conditions, the lower arm 62 of the gripping member 58 will be at its maximum distance from the lower surface 64 of the cap 52, and said lower surface 64 will be substantially adjacent to the plane 38 defined by the lower surfaces of the rollers 33 and 37.

The tension gauge 10 is now moved sidewardly toward a belt 14 until said belt engages the lower projections 32 on each end of the U-bar 23, which places the belt between the lower surface 64 of the cap 52 and the lower arm 62. By engaging the long projections 32, the belt 14 is automatically placed in proper position with respect to the lower surface 64 of the cap 52. The manual pressure urging the knob 47 toward the cylindrical member 21 is now released and results first in upward movement of the gripping member 58, due to the compressed spring 63, until the reach of the belt 14 is snugly held between the lower arm 62 and the lower surface 64. This movement is followed by an upward movement of the entire plunger 12 including the cap 52 and the gripping member 58 until the tension in the belt 14 and the upward urging of the spring 43 are balanced. The tension in the belt 14 can then be read directly upon the dial plate 73 by aligning the indicator 87 with the nearest mark 86 on the peripheral edge 84 of said dial plate 73. The positive relation between the movement of the cap 52 and the dial plate 73 permits accurate readings of the tension in the belt 14. Because of the fact that the upper surface of the belt 14 is engaged not only by the rollers 33 and 37 but also by the lower surface 64 of the cap 52, inaccuracies in the thickness of the belt 14 are of no consequence in the results produced by the tension gauge 10. More specifically, after the post 82 engages the lower end of the slot 79 in response to downward movement of the plunger 12, further downward movement of the rod 40 to increase the space between the cap 52 and arm 62 does not alter the position of the cap 52 with respect to the plane defined by the lower surfaces of the rollers 33 and 37. Thus, a minor variation in the space between the cap 52 and arm 62, due to a minor inaccuracy in the belt thickness at this point, will not change the zero position of the tension indicator, nor will it materially affect the final tension reading.

When the tension has been observed on the dial plate 73, the knob 47 is again pressed toward the cylindrical member 21 until the rack post 82 and the arm 57 are bottomed in their corresponding slots 79 and 56, respectively. This releases the hold of the gripping mechanism 13 upon the belt 14 and thereby permits sideward movement of the tension gauge 10 and the long projections 32 away from the belt 14. The pressure on the knob 47 is again released and the operation of the tension gauge 10 is completed.

Although a particular preferred embodiment of the invention has been disclosed above in detail for illustrative purposes, it will be understood that variations or modifications of such disclosure, which lie within the scope of the appended claims, are fully contemplated.

What is claimed is:

1. A gauge for determining the tension on an element, comprising: a frame having a pair of spaced element engaging surfaces facing in substantially the same direction; an element engaging member supported upon said frame for movement substantially parallel with said direction, said member having an end surface facing said direction and movable into and out of a terminal position disposed between said element engaging surfaces and substantially within a plane defined by said surfaces; means resiliently urging said engaging member in the opposite direction away from said position; gripping means on said engaging member for holding the element against said end surface of said engaging member; and means supported on said frame and coupled with said engaging member for indicating the distance between said member and said position, such distance being proportional to the tension on said element.

2. A device for determining the tension on an elongated element, comprising: a frame having a pair of spaced, substantially coplanar surfaces facing in substantially the same direction for engaging said element; a plunger reciprocably supported upon said frame between said surfaces for lengthwise movement, said plunger having an end surface facing in said direction and movable toward and away from a terminal position wherein said end surface of said plunger is adjacent to and substantially parallel with the plane defined by said coplanar surfaces, the lengthwise axis of said plunger being substantially perpendicular to said plane and intersecting said plane approximately midway between said coplanar surfaces; resilient means on said frame urging said plunger away from said plane; gripping means on said plunger for holding the element against said end surface thereof adjacent to said plane; and indicator means mounted upon said frame and coupled with said plunger for indicating the position of said end surface of said plunger with respect to said plane.

3. The structure of claim 2 wherein said plunger includes a rod having a cap sleeved on the end thereof adjacent to said plane and providing said end surface, wherein said gripping means is rigidly secured to said rod, and wherein resiliently compressible means is disposed between said cap and said rod for urging said gripping means toward said cap and thereby clamping said element against said cap.

4. The structure of claim 3 wherein said indicator means includes a rack connected to said cap and extending parallel with and being movable by said plunger, and a dial face pivotally supported upon said frame and coaxially connected to a pinion engaged by said rack whereby said dial face rotates in response to lengthwise movement of said plunger.

5. A gauge for determining the tension on an element, comprising: a frame having a pair of spaced element engaging ends facing in substantially the same direction; an element engaging member supported upon said frame for movement substantially parallel with said direction, said member having an end facing in said direction and movable into and out of a terminal position disposed between said element engaging ends and substantially within a plane perpendicular to the direction of said movement and including said ends; means resiliently urging said engaging member in the opposite direction away from said position; holding means on said engaging member for pressing the element against said end of said engaging member; and means supported on said frame and coupled with said engaging member for indicating the distance between said member and said position, such distance being proportional to the tension on said element.

References Cited in the file of this patent

UNITED STATES PATENTS

| | | |
|---|---|---|
| 1,357,323 | Jaques | Nov. 2, 1920 |
| 2,085,883 | Weeks | July 6, 1937 |